US011522352B1

(12) United States Patent
Shell

(10) Patent No.: US 11,522,352 B1
(45) Date of Patent: Dec. 6, 2022

(54) SUPPORT SYSTEM FOR ISOLATED PHASE BUS ENCLOSURE

(71) Applicant: Crown Electric Engineering & Manufacturing LLC, Middletown, OH (US)

(72) Inventor: Chad Shell, Liberty Township, OH (US)

(73) Assignee: Crown Electric Engineering & Manufacturing LLC, Middletown, OH (US)

( * ) Notice: Subject to any disclaimer, the term of this patent is extended or adjusted under 35 U.S.C. 154(b) by 78 days.

(21) Appl. No.: 17/187,367

(22) Filed: Feb. 26, 2021

(51) Int. Cl.
H02G 3/04 (2006.01)
F16L 3/10 (2006.01)

(52) U.S. Cl.
CPC .......... H02G 3/0481 (2013.01); F16L 3/1058 (2013.01)

(58) Field of Classification Search
CPC .... H02G 3/0481; F16L 3/1058; F16L 3/1091; F16L 3/1075; F16B 2/10
USPC .......................................................... 248/70
See application file for complete search history.

(56) References Cited

U.S. PATENT DOCUMENTS

| 991,769 | A | * | 5/1911 | Catelain | F16L 33/04 24/281 |
| 2,550,001 | A | * | 4/1951 | Button | F16L 3/1091 248/70 |
| 3,679,240 | A | * | 7/1972 | Turgeon | F16L 21/022 403/312 |
| 4,308,648 | A | * | 1/1982 | Fay | F16L 33/04 24/280 |
| 4,381,020 | A | * | 4/1983 | Daghe | F16L 21/005 24/279 |
| 4,826,113 | A | * | 5/1989 | Winters | F16L 3/24 248/228.3 |
| 5,215,281 | A | * | 6/1993 | Sherman | F16L 55/035 248/62 |
| 5,329,673 | A | * | 7/1994 | Mason | F16L 33/04 24/19 |
| 11,437,791 | B2 | * | 9/2022 | Rouleau | H02G 3/32 |
| 2003/0196301 | A1 | * | 10/2003 | Schaub | F16L 33/04 24/279 |
| 2007/0131442 | A1 | * | 6/2007 | Arcand | H02G 5/066 174/28 |
| 2007/0209166 | A1 | * | 9/2007 | Lovgren | F16L 33/04 24/279 |
| 2008/0040897 | A1 | * | 2/2008 | Schaub | F16L 33/04 24/20 R |
| 2020/0059075 | A1 | * | 2/2020 | Rouleau | H02G 3/0456 |

* cited by examiner

Primary Examiner — Muhammad Ijaz
(74) Attorney, Agent, or Firm — Andrew S. Langsam

(57) ABSTRACT

System and method for supporting an electrical, conductor-carrying set of end to end pipes or enclosures to form an Iso Phase bus for electrical power transmission. The multiple tubular components are axially aligned in the field by a system comprising a saddle support with support legs, brackets for the support legs wherein the brackets secure to the upper flange of an I-beam on a steel support held in the ground. The brackets are adjustably secured to the legs of the saddle support and to the flange of the I-beam. In addition, an over the top enclosure, thin metal strap is provided which is also secured to the bracket and to the flange of the I-beam. Adjustments of the orientation of one enclosure to the adjacent connecting enclosure is able to be done in three axis.

20 Claims, 9 Drawing Sheets

FIG. 8
A.
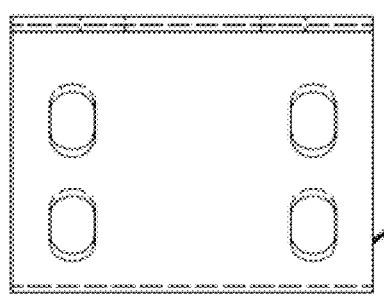
B.
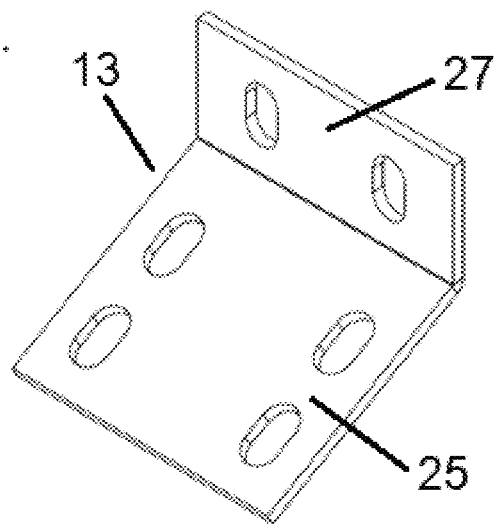
C.
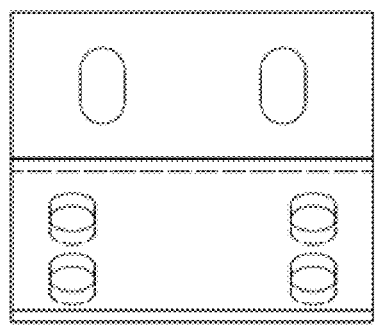
D.
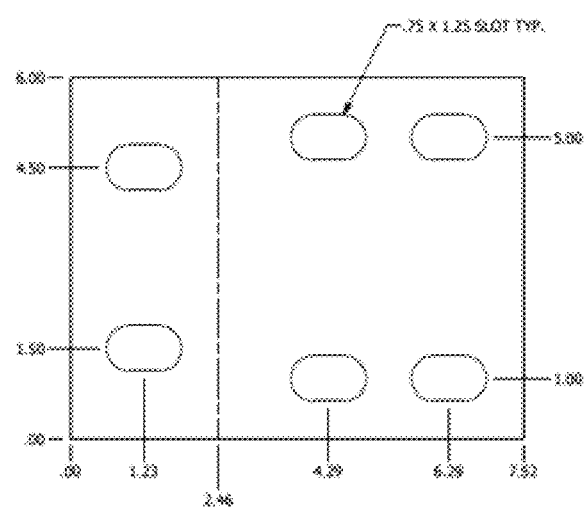
E.
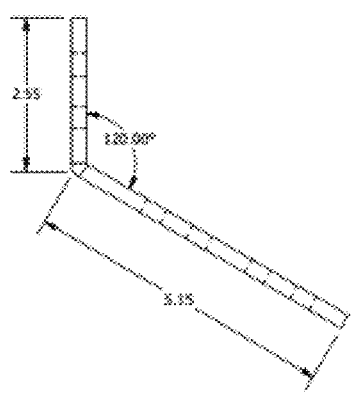

FIG. 9
A.
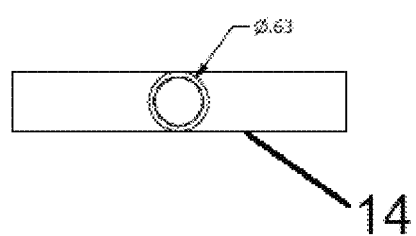
14
B.
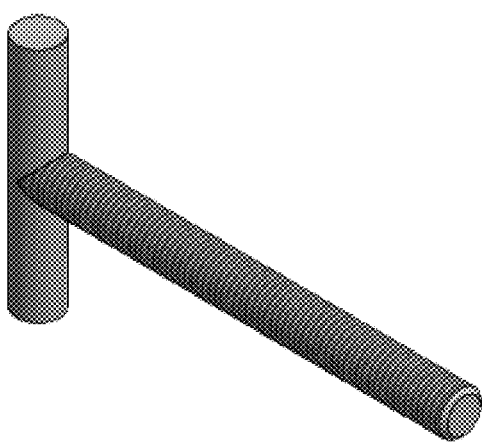
C.
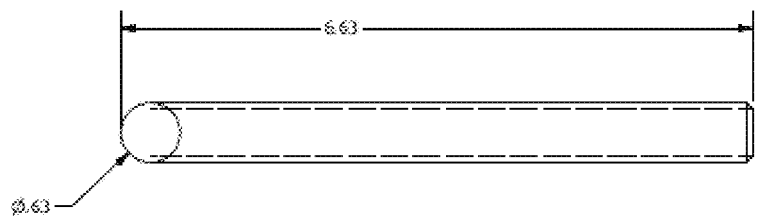
D.
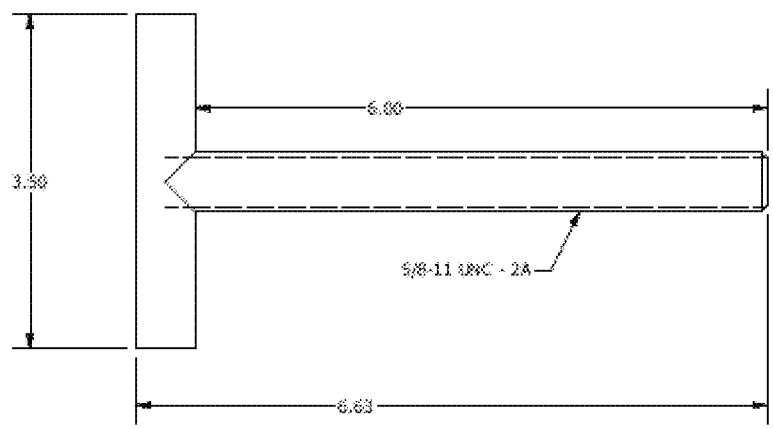

SUPPORT SYSTEM FOR ISOLATED PHASE BUS ENCLOSURE

TECHNICAL FIELD

The present invention relates to a system, end product, and method for adjustably supporting large conduit-containing tubes or pipes for the containment and passage of electrical conductors to connect the electrical transmitted power between a generator and a transformer while protecting the same in a grounded cylindrical housing. More specifically, the present invention relates to an iso phase bus system, end product, and method utilizing a support saddle on an I-beam (itself supported on a steel support in the field) for a large conductor-carrying tube or pipe in association with a saddle strap and a set of support brackets. Adjustment of the support in the field is a key aspect of the present invention. The components cooperate with a supporting I-beam/rail to both wrap around and hold, and support the large and cylindrical pipe while allowing for in-the-field adjustment of the alignment of one pipe segment to the adjacent pipe segment in three axis or planes.

BACKGROUND OF THE INVENTION

In large electric power generating stations, the generator is the mechanism or machine that most likely converts (various forms of input energy) water, oil, gas, nuclear or other mechanical energy to deliverable electrical energy. That energy is intended to be ultimately converted and transported to consumers (factories, substations, businesses, buildings, residential home consumers, etc.). Before being transmitted, the electrical energy of the generator is first passed to a step-up transformer. Usually, the safe, rugged connection between the generator and the step-up transformer is known as the Isolated Phase Bus (also known as "Iso Phase Bus," or "IPB"). Isolated Phase Bus is a custom designed electrical pathway consisting of a series of end to end connected large tubes or cylindrical pipes, carrying very high amperage (the output production of the generator) and safely delivering it to a large step-up (step up in terms of voltage and down in terms of amperage) transformer, usually located in the power plant's adjoining switchyard. That transformer "re-packages" the electrical power (by stepping up the voltage and thereby commensurately lowering the amperage) to be delivered to a myriad of distribution substations for ultimate delivery to customers throughout the servicing area.

The Iso Phase Bus gains and retains its robustness by performing three important functions. It separates each of the three (3) phases of electrical power into their own mechanically conducting paths; it safely protects that conducting path with a surrounding, electrically grounded rigid metal enclosure; and it separates each of those three grounded metal enclosures with an air gap for further electrical isolation from electrical faults.

From a mechanical and visual perspective, an Iso Phase Bus is a high conduction, thick-walled metal "pipe" (called the conductor) which is located within a far larger diameter, yet thinner walled outer "pipe" (called the enclosure). As both the conductor and enclosures are preferably cylinders and concentrically arranged, long and tubular, the term "pipe" is generically and visually appropriate; however, unlike a traditional pipe, the conductor and enclosure in the Iso Phase Bus context are not configured to convey water, other fluids, nor gases. Rather the large enclosure pipe serves to contain the conductors contained therein from generation plant to user, in a safe manner. Both the conductor and exterior enclosure are preferably manufactured from high conductivity aluminum. Engineering constraints require that both conductor and enclosure must be able to properly handle the same amount of current, and therefore the center conductor pipe—which has a relatively smaller diameter—will preferably have a thicker material wall dimension (preferably around ½" thick), while the outer thinner-walled enclosure—which has a larger pipe-like diameter—can mathematically have about the same amount of total metallic material per unit length yet with a thinner wall thickness (preferably around ¼"). The conductor is preferably held in the center of the enclosure by rigidly mounting non-conducting "stand-off" insulators inside the cylindrical enclosure that allows and maintains the conductor to sit on top of the insulators in the center of the enclosure. Some manufacturers use two or three concentric, ring-like insulator designs to hold the conductor in a substantially centered position within the enclosure.

Throughout the electric power generating industry, the overall length from generator to step-up transformer (of ¼" thick, outer aluminum cylindrical-enclosures) is built and developed by fabricating and delivering to the field site numerous pipe-like connectible segments, each being an enclosure and containing the conductor elements. In the field, those cylindrical pipe elements are connected, end to end to form the length of the Iso Phase Bus. Generally, the field is prepared by engineers and construction workers so that steel supports are spaced and located in the ground and atop each steel support is an I-beam, to support the pipe segments. According to the prior art method of building an Iso Phase Bus line of segments, the segments are provided with brackets, welded "at the shop" to the bottom outside edge of each pipe. The brackets are generally similar to that shown in FIG. 1. They support the pipe on the ends of the bracket and in the middle, where the bracket comes into contact with the pipe. As the pipe segment, with its welded-on bracket, is placed upon the I-beam of the in-ground steel support, misalignment often occurs. The pipe is generally supported by a crane and chain around the pipe as it is lowered into place. It is there that the construction operation must then, due to the often misalignment, cut the welds of the bracket to the conduit cylinder, reposition the bracket, shim one or the other side, and reweld the joints of bracket to outside surface of the pipe. This is messy, expensive, time consuming and can be avoided by the present invention.

The make up of the Iso Phase Bus generally includes many pipes, connected end to end, each being up to but not longer than about 6 feet in length, and then coupling these numerous segments together end to end, such as by welding. Thus, a long continuous enclosure is produced with the conductor held therein. As these segments are joined for substantial distances, the alignment of the large tubes is often problematic. And, because of their size and substantial weight, a consequence of the large diameter, rounded enclosures, the insulators, the conductors contained therein, it is important to provide a structurally strong base support system for the enclosures. Those base supports are steel supports into the ground which usually are provided with horizontally extending I-beams. It is on those I-beams that the prior art supporting saddles are placed. The present invention uses the same steel supports and I-beams but provides adjustment and thus alignment in the field without the need for cutting the welding, without the need for shimming and without the need for rewelding of bracket to outside of the enclosure. Basically, the invention disclosed herein provides adjustment in three planes or axis and the assembly of the enclosure to the I-beam is after the positioning of the pipe section on the steel column, as it is hanging from a crane. The present invention allows for adjustable movement and alignment of pipe to adjacent pipe segment in all three planes or axis. So, once the Iso Phase Bus is properly set on the top of the steel support column and I-beam, from side to side, it can easily be tipped up or down a bit or one can swing the same side to side. The new and inventive mounting mechanism allows for this 3 dimensional play, in the field, with minimum time and cost and without in the field welding. And, this allows the installers to completely and accurately align each Iso Phase Bus or pipe segment as the project proceeds from one end of the run to the other.

FIG. 1 illustrates a prior art enclosure support, demonstrating a basic welded-on bracket configuration. The prior art bracket support often includes a piece of flat metal acting as a support bracket, the central area supporting the bottom exterior of the enclosure pipe, with the bracket having upwardly bent flanges to also support the pipe. The bracket is often welded in the fabrication shop to the base of the pipe. The pipes and brackets are transported to the site and then hoisted by crane onto the I-beams. The pipes are then secured to the steel support structures held in the ground. As the ground is not perfectly level or flat, the alignment of the pipe segments in the field is difficult and, quite often, the welded-on brackets need to be cut, removed, shimmed, and/or altered in the field, to allow for the alignment and joining of adjacent pipe enclosures. Clearly this is wasteful, time-consuming and impacts negatively on the structural integrity of the brackets and the pipes.

There appears to be a great need in the industry for a simple, efficient, adjustable means of altering the alignment of the adjacent pipes in all three axes. The present invention provides that solution and allows the workers in the field to adjust the end to end pipe segments (while the same are supported and being lowered into place by supporting crane-like field machinery) in three axis so that one segment of the Iso Phase Bus is precisely aligned with another segment, as the same are supported by the steel structures and I-beams which have already been placed. Those in-the-ground steel supports have a simple horizontal I-beam connected and the present invention uses those I-beams as a basis for connecting adjustable brackets which cooperate with a supporting saddle and a strap. The adjustment mechanism allows for in-the-field precise adjustment of the end to end cylindrical segments to ensure precise axial alignment.

The prior art support brackets are, as mentioned, welded to the bottom of the enclosures and to adjust alignment in the field, it is generally necessary to sever the weld, use shims, etc. That, however, is difficult and time consuming in the field and impacts on the integrity of the weld and its support. The support saddle shown in FIG. 1 simply permits a bottom portion of the enclosure to rest on the welded-to-it saddle bracket, and that bracket is secured or placed atop the I-beam support and the underlying steel support, in the ground. There is thus no easy manner of three axis adjustment in the field and no over-top strapping of the enclosure to the saddle or brackets and thus to the I-beam. Yet, that is desirable to ensure easy, quick and accurate alignment and structural integrity.

Additionally, the welded-on brackets of the prior art do not conform to the cylindrical exterior shape of the enclosure but for two flanges of the bracket and the central bottom portion of the enclosure; rather, the enclosure sits between the two 90° upwardly angled arms or flanges of the bracket where welding has been accomplished. Accordingly, there is a need in the art for an Iso Phase Bus and enclosure support system comprised of enclosures or pipe segments, such that an in the field adjustment in three axis or planes can be accomplished without welding, difficulty and without impacting on the structural integrity of the support mechanism. The present invention accomplishes this. It provides for superior base support of a bottom portion of the enclosure while strapping down and engaging with an upper portion of the enclosure, such as by wrapping over and strapping down the enclosure to the I-beam support and allowing for the alignment of a first segment to a second segment and on and on, in the field, and in three axes.

SUMMARY OF THE INVENTION

In general, in one aspect, the invention features a system for supporting an enclosure (pipe-like electrical, conductor containing tube) for end to end adjustable connection to another enclosure or pipe to form a substantially continuous, aligned, easily in-the-field adjustable length of conductors and enclosures. The present invention is intended for use in the Iso Phase Bus field for electrical power transmission systems. The present invention utilizes the prior art support structure of a steel support set in the ground and a simple horizontally-extending I-beam set atop the steel support. The present invention provides a saddle-like support device for the bottom of the enclosure. Generally, the radius of curvature of the support saddle matches that of the pipe segment or enclosure to be supported. This first component comprises a bottom saddle having a concave central region configured to support an arc-segment of the exterior bottom portion of the enclosure. The far ends of the central saddle section are provided with a pair of downwardly and outwardly extending support legs. These are provided with apertures or holes to allow the saddle member to be adjustably yet securely connected to brackets (to be described). A strap or strip of metal is configured to wrap over a top portion of the enclosure, the strap affixed with two strap threaded studs or T-shaped bolts comprised of a long, central threaded end between the ends of the top of the T and perpendicular to the head of the T. Each stud or T-bolt is disposed at opposite ends of the strap. A bracket or base/saddle supporting member is connected to both the downwardly and outwardly extending support legs of the saddle and to the existent I-beam. The I-beam is secured to the steel support pier secured into ground. The strap with its T bolts is secured to the brackets and the brackets to the I-beam via the threaded leg of the T-bold and a nut, secured beneath the flange of the I-beam. The T bolt passes through apertures of the bracket and into the I-beam. The bracket is preferably also provided with another aperture for securing it atop the I-beam. And the bracket is secured, as mentioned, to the support legs of the saddle bracket. That connection is adjustable, too, as the apertures of the bracket are slotted or elongated to allow some movement of the legs of the saddle support with respect to the bracket. Adjusting of the strap and the positioning of the bracket with respect to the enclosure provides a structurally integral and aligned "fit" for the end to end connected enclosures. All to allow for in the field adjustment of the strap, the saddle, the support legs and brackets on the I-beam. This provides 3 axis adjustment.

Each fastening base member or bracket is disposed on an opposite side of the bottom saddle and has a first end, a bend, and a second end, where the first end is connected to a support leg of the bottom saddle, and where the second end is connected to the I-beam via a strap stud (a T-shaped member connected to the strap), with the threaded end of the T-shaped member passing through the second end of the bracket and into the I-beam.

Implementations of the invention may include one or more of the following features. The enclosure (tubular pipe with electrical conductors within) have tubular segments and may be an isolated phase bus enclosure. The enclosure is pipe-like and may have a diameter of approximately 44 inches. Each of the bottom saddle and the two fastening base members or brackets may be composed of aluminum. Each of the bottom saddle and the two fastening base or bracket members may have a thickness of about ¼ inch. The metallic strap may be composed of stainless steel. The strap may have a thickness of about 0.035 inch. Each strap stud or T-bolt may have a T-shaped configuration and a central and long threaded leg. The side bars of the top of the T extend transverse to the strap and connect the strap stud to the strap. The long leg, threaded, is the means for connecting the ends of the strap to the brackets and to the I-beam. The long, central and threaded leg of the T-bolt passes through an aperture of the bracket and is secured to the I-beam by a nut. The strap is thus adjustable with respect to its tension on and over the top of the enclosure and to the bracket, which itself is adjustable and positionable with respect to the saddle support and the support legs of the saddle support. Pulling and securing the strap will downwardly pull the enclosure towards and secure the same to the I-beam. The angled bend in each of the two fastening base members or brackets may be a 120° bend. The brackets have apertures for bolts and nuts (and the threaded long leg of the T-shaped bolt or stud) to secure to the I-beam, to the T-shaped bolt or stud, and to the downward and outwardly extending legs of the saddle base member. Some of the apertures can be elongated to allow for flexibility of adjustment of the components to ensure that the enclosure run, the Iso Phase Bus, is comprised of aligned segments of pipe, easily and accurately adjusted in the field. The I-beam may be composed of steel and is horizontally supported on an end of a large steel support, itself secured into the ground.

In general, in another aspect, the invention features a method for supporting an enclosure having a series of end to end tubular or pipe segments for forming a complete Iso Phase Bus system for carrying electrical conduit, including placing the enclosure on a bottom saddle having a concave central region and outwardly and downwardly extending support legs at opposite ends of the central saddle support section. The support legs and the saddle are laid on top of the I-beam and the pipe segment set into the saddle, the concave area corresponding to the bottom outside circumference of the pipe segment. The concave central region of the saddle member supports a large arc portion of the exterior bottom of the enclosure. A set of brackets adjustably secures the support legs to the flange of the I-beam. A strap extends from the brackets, where they secure to the I-beam, over a top portion of the enclosure, the strap being also secured to the I-beam. The straps are held to the brackets via two strap T-shaped bolts or studs, each stud having a central and long threaded leg between the ends of the top of the T and connected to and transverse to the longitudinal axis of the strap. The threaded leg of the T-shaped stud member is disposed at opposite ends of the strap; connecting each end to the same saddle support bracket which is in turn connected to the I-beam.

Implementations of the invention may include one or more of the following features. The enclosure is a component of an iso phase bus used for transmitting high voltage electric lines from power generator to user. These are comprised of a series of end to end lage pipe like and cylindrical conduits with conductors coaxially passing down the inside middle of the pipes. The pipes are necessarily aligned and should be easily connected, as they are massive in size and with significant weight. The enclosure comprises one or more tubular segments and may be a portion or all of an isolated phase bus. The enclosure may have a diameter of approximately 44 inches although some enclosures can get up to 5 feet or more in diameter. The present invention is described with respect to a higher side of the median of dimensions and all components and materials may have to be adjusted accordingly.

The present support and alignment system comprises a bottom saddle for holding the bottom of the enclosure, with the saddle having two support legs extending downwardly and outwardly. Two brackets connect and hold the support legs. The saddle piece may be composed of aluminum. Each of the bottom saddle and the two brackets for securing to the legs and to the I-beam may have a thickness of about ¼ inch. The strap may be composed of thin stainless steel. The strap may have a thickness of 0.035 inch. Each end of the strap is secured to a T-shaped stud or bolt and it is secured to the bracket, adjustably, which in turn is secured to the top flange of the I-beam. The threaded leg of the T-bolt, connecting the strap to the I-beam allows for adjustable tension of the strap over the top of the pipe. The strap and its adjustability with respect to the enclosure and the I-beam allows for in-the-field adjustment.

The bend in each of the two fastening base members or brackets may be a 120° bend. The brackets are provided with apertures and elongated apertures to allow for three axis adjustment of the enclosures with respect to the I-beam, in the field.

BRIEF DESCRIPTION OF THE DRAWINGS

FIG. 8 provides several views (side views, perspective, a view prior to bending, and the bent configuration) for the supports for the legs of the saddle support and the apertures used for holding the same to the legs and to the top flange of the I-beam, with the T-shaped bolt and an ordinary bolt; all for an enclosure support system according to the preferred embodiment of the present invention; and FIG. 9 provides several views (top, perspective, side and front) of a saddle strap stud or T-shaped threaded bolt (before securement to the strap) of an enclosure support system according to the preferred embodiment of the present invention.

DETAILED DESCRIPTION OF THE DRAWINGS, THE PREFERRED EMBODIMENT AND THE INVENTION

Figure 1:
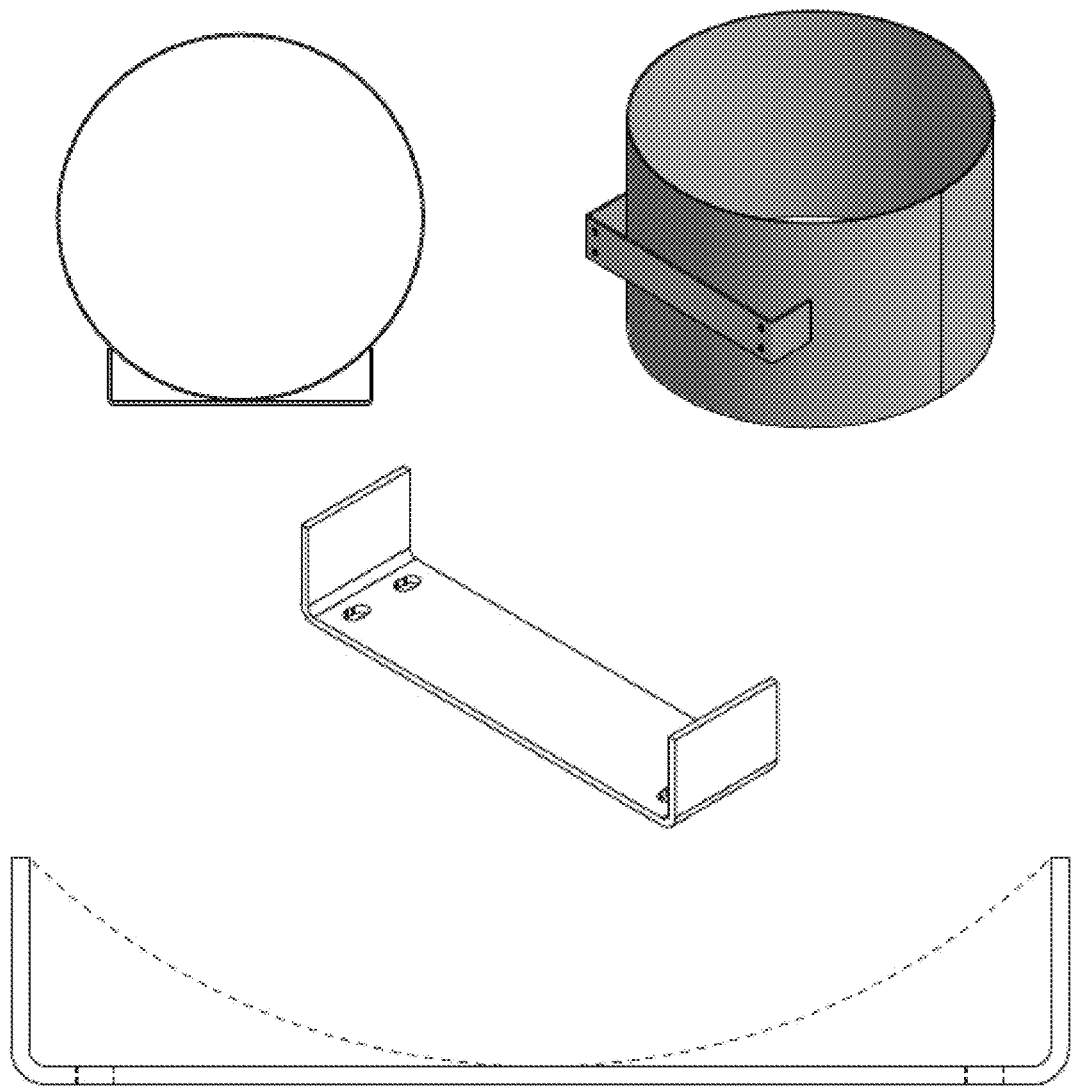
FIG. 1 illustrates (frontal view, perspective of bracket welded to pipe or enclosure, perspective of the bracket and side and enlarged view of the bracket, the previously-known enclosure support systems having a basic saddle, welded to the base portion of an enclosure with upwardly extending side-located legs or support brackets.

The prior art mechanism and system for supporting enclosures, such as that of an Isolated Phase Bus, is set forth in FIG. 1. As illustrated and used, the bracket permits the enclosure to rest on and be welded between upwardly extending arms at opposed ends of the bracket and on and to the flat base of the bracket. No other components are provided with the bracket in performing this support mechanism, and the enclosure is only supported by the bracket on a bottom portion of the enclosure and the two edges of the arms. In use, the bracket is welded to the enclosure tube at the fabrication site and then taken to the field for installation, pipes being assembled end to end, with the brackets being secured to I-beam flanges of I-beams, which are supported on steel, in ground, supports. When alignment is not precise, in the field, as is quite common, the welded joints are broken, changed, altered, then shimmed and rewelded in the field. Clearly that is time consuming, difficult and results in less integrity and support. Yet, axial alignment of enclosure segment to enclosure segment (pipe to adjacent pipe) is important. The present invention is meant to eliminate compromising the support and axial alignment of the enclosures, end to end, and allow for the ease of adjustment in three axis or planes, of the enclosures in the field.

FIGS. 2-5 illustrate and provide a first and preferred embodiment of an enclosure support system of the present invention. As can be seen in these Figures, an enclosure support system 1 includes a central bottom saddle portion 11 with outwardly and downwardly extending support legs 21, a thin metallic sheet of metal in the shape of a saddle strap 12, outer bottom saddle portions or brackets 13, and a saddle strap stud or T-shaped bolt member 14. The system 1 is intended to be secured to a cylindrical end or section/part of a tubular segment 20 a piece of the overall Iso Phase Bus enclosure conduit. The system 1 is disposed or secured, bolted to or otherwise held onto a horizontally extending I-beam with a top flange, a beam/rail 30, which is secured to a cylinder of cement or concrete or another piece of steel which is secured and held vertically in the ground. A set of those spaced support cylinders or steel structures, with the I-beams horizontally secured atop, are the preliminary engineering requirements for building a set of end to end electrical conduits or an ISO Phase Bus enclosure for a power generating system. Generally, the I-beams 30 extend across the axis intended to be laid by the end to end pipes or conduits. The top flanges of the I-beam 30 provide support for the brackets of the present invention and locations for apertures for bolts to hold the brackets to the I-beam. In addition, the top flange of the I-beam is drilled with apertures for receipt, as will be explained, of the long-threaded leg or end of the T-bolt of the present system, which secures the ends of the strap to the brackets and to the beam.

Figure 2:
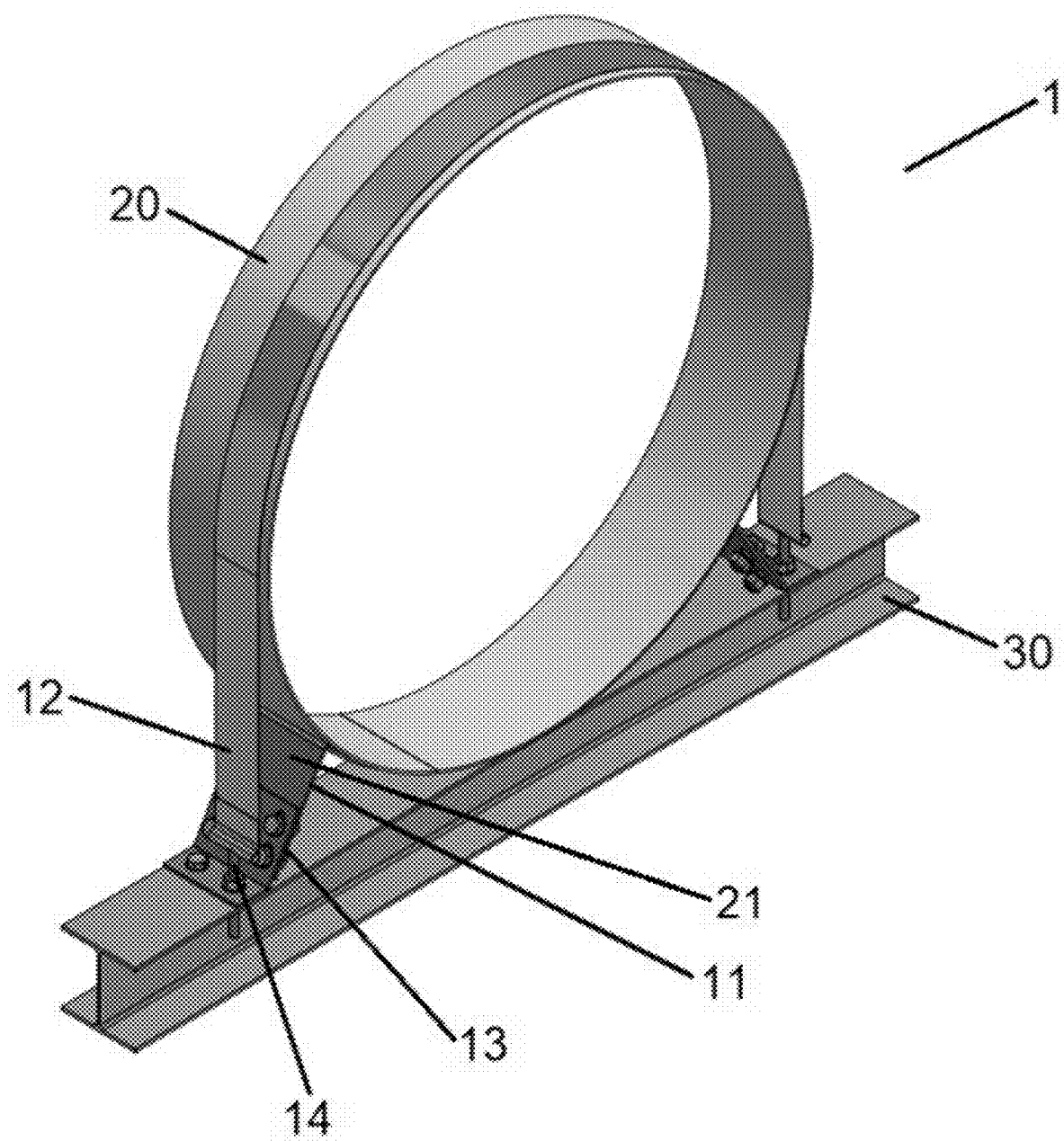
FIG. 2 illustrates a perspective view of an enclosure support system for an enclosure (only a short segment of the enclosure being shown) according to the preferred embodiment of the present invention.
Figure 3:
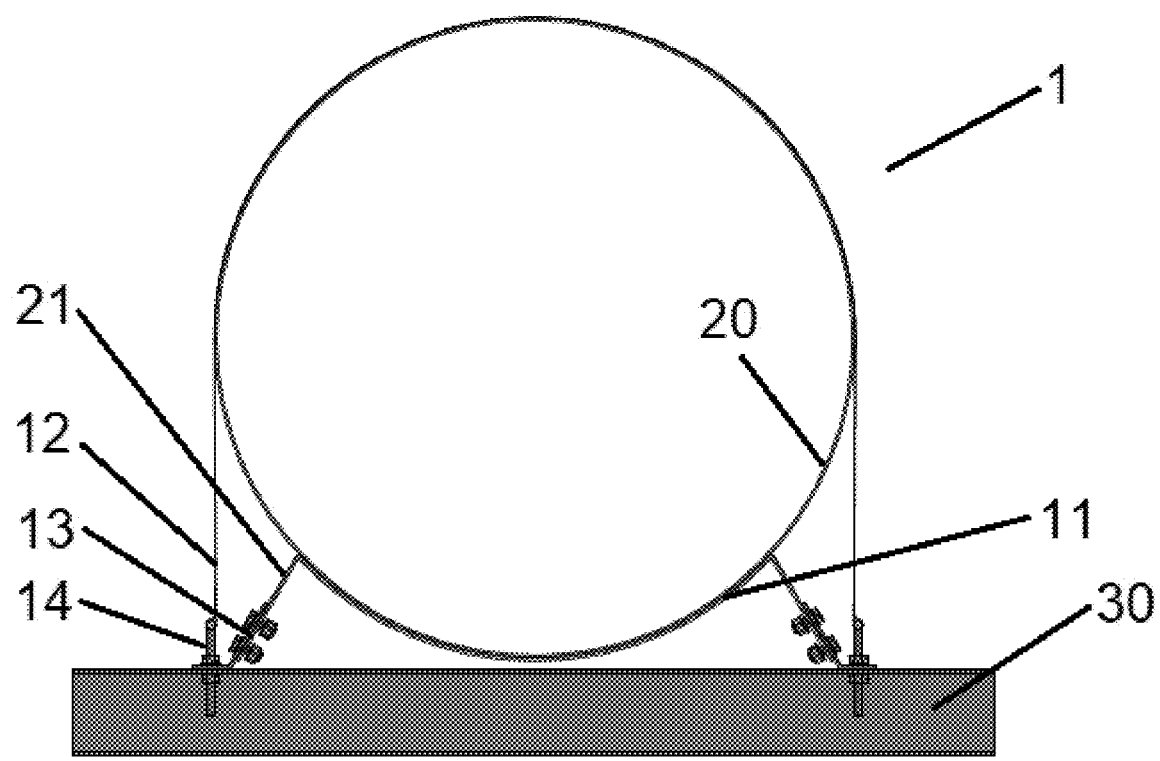
FIG. 3 illustrates a front view of the enclosure support system of FIG. 2, for supporting a pipe or enclosure of the Iso Phase Bus.
Figure 6:
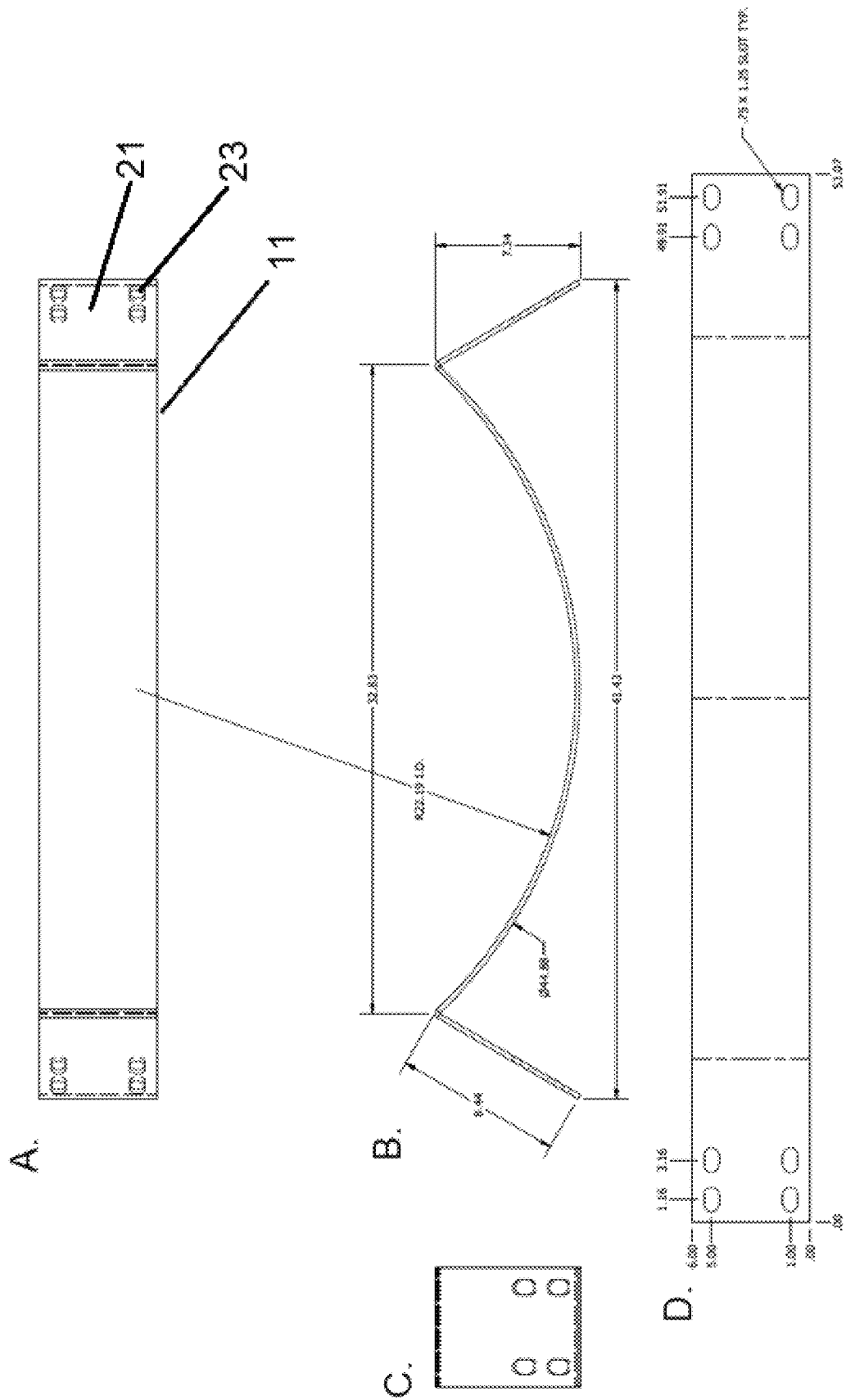
FIG. 6 provides several views (top, perspective, pre-bent drawing, and side view of a central bottom saddle member or portion of an enclosure support system according to the preferred embodiment of the present invention.

Central bottom saddle portion 11 (as best seen in FIGS. 2, 3 and 6) supports a bottom, arc-shaped and exterior portion of tubular segment or enclosure piece 20. Segment 20 may be a segment of the enclosure itself or an associated aspect thereof, such as a circular band welded to the pipe pieces for connecting two ends of adjacent enclosure segments. Saddle portion 11 includes a concave middle region disposed in contact with, and corresponding to the shape of, the exterior and bottom of segment 20. Additionally, bent downwardly and outwardly from the ends of the concave middle region, portion 11 also includes outwardly and downwardly directed support legs 21. The support legs 21 are provided with two rows or sets of vertically and horizontally aligned apertures 23 (see FIG. 6) which interact with and are connected to the apertures of the brackets 13. Preferably these apertures for the support legs of the saddle are circular but, they could be elongated holes, too. Preferably, the saddle support is made of metal, preferably about ¼ inch in thickness.

Saddle strap 12 (see FIGS. 2, 3, 4, 5 and 7) is a thin belt of thin metal, preferably stainless steel or other metal, at about ⅛ inch or 0.035 inches of thickness. It extends from the brackets held into the top flange of the I-beam 30, and over the top of segment 20 and is capable of bending and conforming its shape to that of the upper and exterior arced portion of segment 20. At both ends of saddle strap 12, a saddle strap stud or T-shaped bolt 14 may be disposed and attached thereto, such as at a looped end region of strap 12. Accordingly, system 1 preferably includes two such T-shaped studs or studs. Stud 14 interacts with and is connected first to one flange of a bracket and then to the top flange of the I-beam. The other flange or end of the bracket 13 is secured to the legs 21 of the saddle bracket. More specifically, the long and threaded end of the T-shaped stud 14 passes through holes provided in bracket portion 13 and into the top flange of the I-beam. The threaded T-shaped bolt allows for ease of adjustment of the tension of the strap over the top of the enclosure.

The saddle holding brackets 13 (see FIGS. 2, 3, 5 and 8) have a bent configuration. The bent configuration permits the bracket 13 to interact with both the legs 21 of the central bottom saddle portion 11 and the top of the flange of the I-beam 30. One flange of the brackets 13 is secured to the top of the flange and the upwardly bent flange of the brackets 13 is secured to the legs 21 of the saddle bracket 11. Accordingly, system 1 preferably includes two such brackets 13. Ultimately, portion 13 is the component of system 1 through which both central bottom saddle portion 11 and its legs and saddle strap stud or T-shaped member 14 with its elongated leg are affixed to the top flange of I-beam/rail 30.

For affixing or otherwise connecting components of system 1 together, industry-accepted fastening mechanisms may be utilized, including but not limited to bolts, washers, and nuts. In a preferred embodiment of the present invention, however, a newly created T-shaped member, a bolt with a threaded long end or stud 14 is shown in FIGS. 2, 3, 4 and 5, for example, is provided for holding the strap 12 to the brackets and the bracket to the I-beam.

FIG. 6 provides dimensions for an exemplary central bottom saddle portion 11 of the present invention, chief among them is that the concave middle region accounts for a diameter of approximately 44 inches. The outwardly directed diagonal regions or support legs 21 of portion 11 may each include four holes therein for ease of attachment to the longer flange 25 of the brackets 13. Portion 11 may be composed of aluminum and may have a thickness of ¼".

Figure 4:
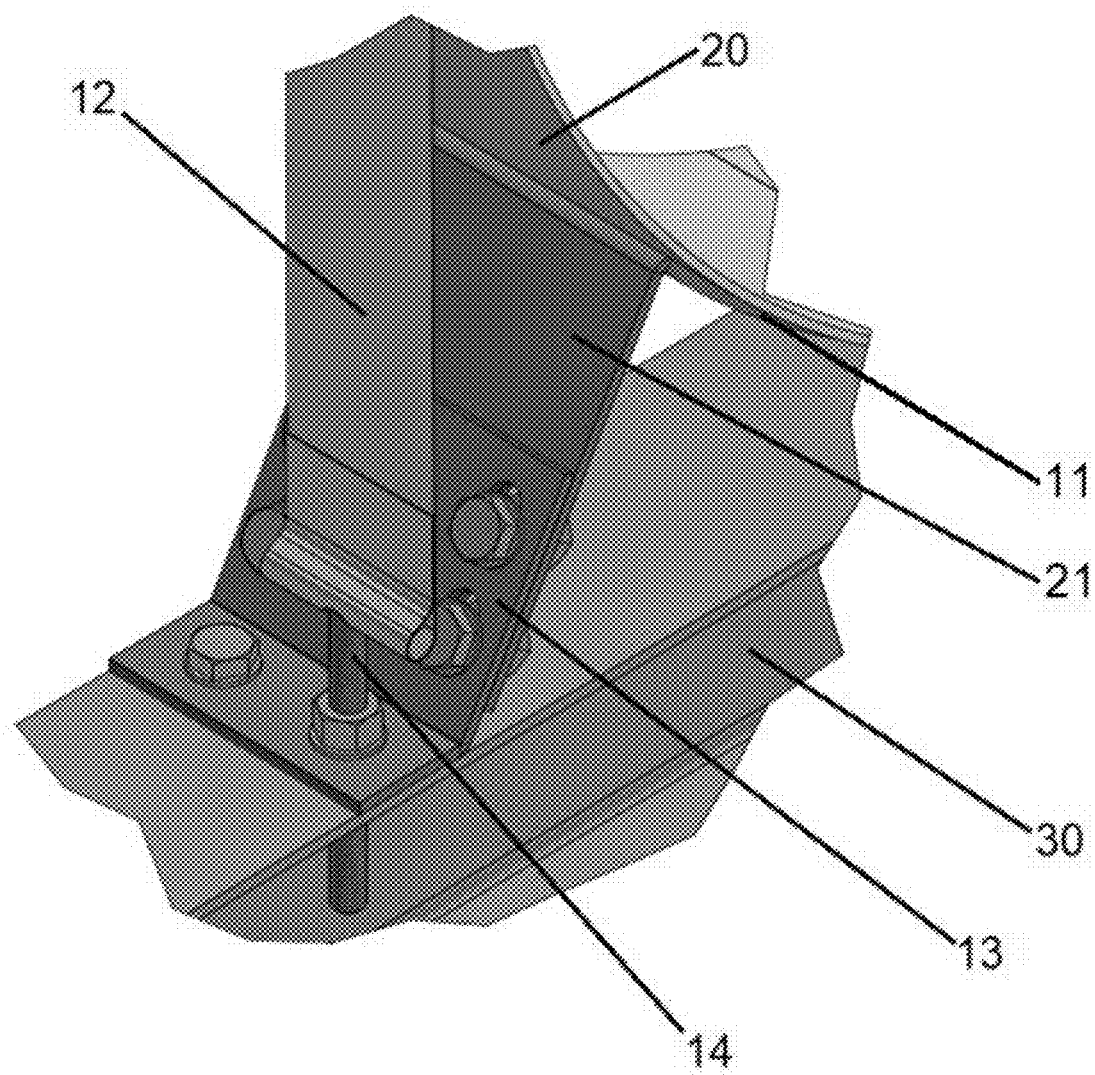
FIG. 4 illustrates an enlarged and partial perspective view of a portion of the enclosure support system of FIG. 2, showing a part of the support saddle, a support leg, a bracket, the strap with T-shaped bolt, as secured to the top flange of an I-beam.
Figure 7:
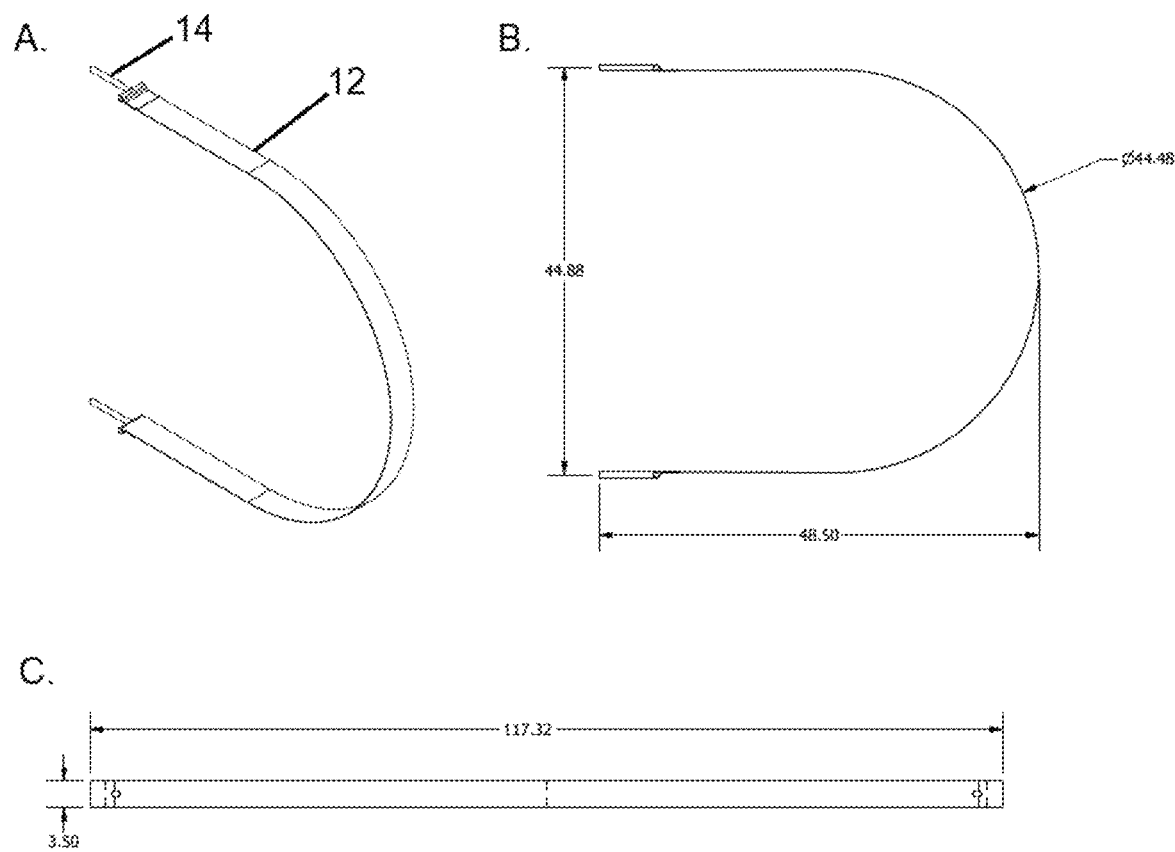
FIG. 7 provides several views (perspective, side and top) of a metal saddle strap of an enclosure support system according to the preferred embodiment of the present invention.

FIG. 7 provides representative dimensions for an exemplary saddle strap 12 of the present invention, chief among them is that the strap 12 is thin metal, bendable, and its flexibility accounts for a diameter of a pipe of approximately in the range of about two to six feet in diameter, but for the purposes of the present example, the diameter is about 44 inches. As shown in FIG. 7C, holes are placed on respective ends of strap 12 such that T-shaped bolt or the long and threaded leg of the stud 14 may be inserted into said holes, whereby the ends are bent upward back onto strap 12, as illustrated in FIG. 7A and welded or otherwise secured thereto. It is preferred that these ends are affixed back onto strap 12, such as by welding, in order to lock stud or T-shaped bolt 14 in place in the looped ends of strap 12. Saddle strap 12 may be composed of stainless steel and may have a thickness of 0.035". The head of the T-shaped member, seen in FIG. 9 extends across the width of the strap and the long leg or threaded bolt of the T-shaped member extends first through the holes of the strap 12 and then into a hole of the short flange of bracket 13 and then into and through the top flange of the I-beam 30, where it is captured by a nut. A set of washers can be used, too, to facilitate the connection and a bolt threaded onto the leg of the T-shaped bolt on the top of the short flange 27 as seen in FIG. 4 to adjust and secure the bracket and the strap to the I-beam 30.

FIG. 8 provides dimensions for an exemplary pair of brackets 13 of the present invention, chief among them is that the angle provided by the bent configuration of portion 13 is 120°¹. i.e., flange 25 is at an angle to flange 27 of about 120 degrees. The longer flange 25 of bracket 13 is utilized in attachment with central bottom saddle portion 11 and, accordingly, includes four holes. These are aligned with the apertures or holes in the legs 23 of the saddle support and preferably are elongated or oval shaped to allow for adjustments of the saddle support and the held enclosure with respect to the bracket and thus with respect to the I-beam. The shorter end flange 27 of bracket 13 is preferably utilized in attaching the T-shaped bolt or stud 14, which is inserted in one of the two holes disposed on the shorter flange end, and beam/rail 30 with the other hole of shorter flange 27 simply used to affix bracket 13 to beam/rail 30. Washers may be used for securement and alignment, if needed. Brackets 13 may be composed of aluminum and may have a thickness of about ¼".

FIG. 9 provides dimensions and views of the preferred and exemplary stud or T-shaped bolt 14 of the present invention. It is secured to one end (two are needed, one for each end) of the strap and the T-shaped bolt, threaded on its longer and central leg adjustably secures the strap, to the bracket and the bracket to the top flange of the I-beam. As previously noted, it is preferable that a portion of stud or T-shaped bolt 14 be threaded in order to permit attachment of the associated end of the strap 12 to the bracket 13 and then the strap and bracket to I-beam/rail 30. T-shaped bolt or stud 14 may be composed of any acceptable material, preferably a metal.

Figure 5:
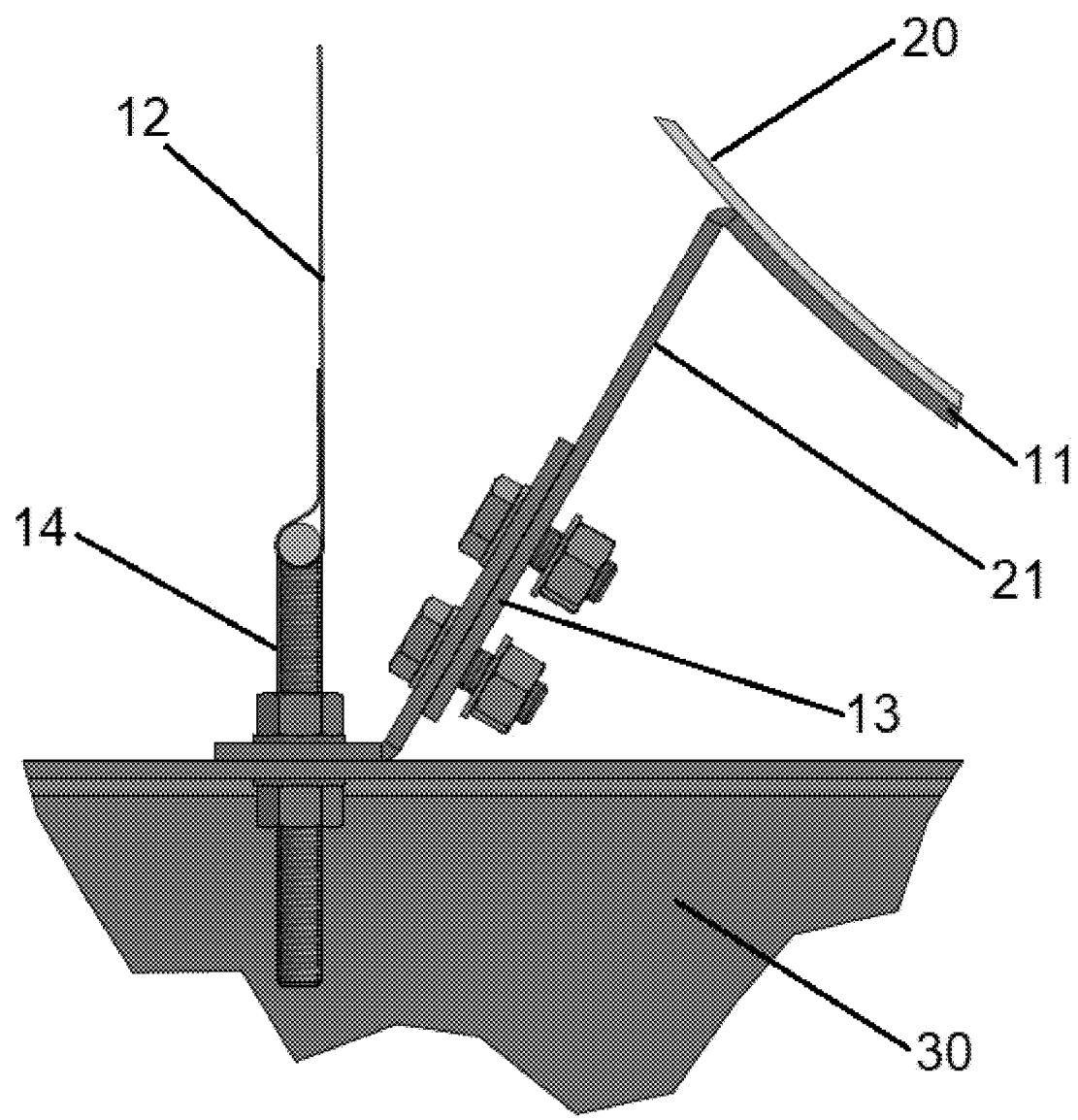
FIG. 5 illustrates an enlarged and partial front view of a portion of the enclosure support systems of FIGS. 2 and 4.

Tubular segment 20 may be composed of any acceptable material, preferably aluminum. Beam/rail 30 may be composed of any acceptable material, preferably steel. Beam/rail 30 preferably includes holes on an upper flange region that permits T-shaped stud or bolt 14 to be affixed thereto, such as by the use of washers and nuts, as illustrated clearly in FIGS. 2, 3 4 and 5. The other side of the top flange of the I-Beam 30 is provided with another aperture for holding a bolt, passing through an aperture of the brackets 13, and a nut beneath the flange. FIG. 5 shows the bolts and nuts securing the large flange 25 to the support legs of the saddle support 11, just before the nuts are tightened—after adjustment and alignment is first accomplished. The strap 12 is adjustably secured over the enclosure/pipe by adjusting the long leg of the T-shaped bolt 14 through the apertures of the bracket's shorter flange 27 and the other aperture of the shorter flange. Once aligned and adjusted, those nuts can be tightened. The result is an in-the-field, aligned, secure, integral, support system for end to end conduits of electrical components for an Iso Phase Bus.

By use of the enclosure support system of the present invention, such as system 1 illustrated in FIGS. 2-5, enclosures including those for Isolated Phase Buses have a greater security by virtue of the over-top strapping, wider base support, and locking/attachment mechanism of the various components together to the beam/rail foundation. Alignment, in the field, is easy, quick, without welding nor destroying of welds, etc.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed but that the invention will include all embodiments falling within the scope of the claims.

What is claimed is:

1. A system for supporting an electrical, pipe-shaped enclosure for creating an Iso Phase Bus for transmission of electrical power and for adjusting in three axis without breaking of welds, comprised of a series of end to end connected pipe members, comprising:
    a bottom saddle support having a central region for supporting a bottom portion of said pipe-shaped enclosure and also having downwardly extending support legs at opposed ends of said central region;
    fastening brackets with securing means for adjustable securement to said support legs, said fastening brackets further including means for securing the same to an I-beam; and
    a strap configured to wrap over a top of said pipe-shaped enclosure, said strap provided with a pair of end bolts, said bolts adjustably securing, each of the ends of said strap to one of each of said fastening brackets and said fastening brackets also to said I-beam.

2. The system of claim 1, wherein the pipe-shaped enclosure is comprised of end to end pipe segments forming an isolated phase bus enclosure.

3. The system of claim 1, wherein the pipe-shaped enclosure has a diameter of approximately 44 inches.

4. The system of claim 1, wherein each of the bottom saddle support and said fastening brackets are substantially composed of aluminum.

5. The system of claim 1, wherein each of the bottom saddle support and said fastening brackets have a thickness of ¼ inch.

6. The system of claim 1, wherein said strap is substantially composed of stainless steel.

7. The system of claim 1, wherein the strap has a thickness of about 0.035 inch.

8. The system of claim 1, wherein each end bolt is in a T-shaped configuration, wherein a central leg of the T-shaped configuration is longer and threaded.

9. The system of claim 1, wherein a bend is provided in each of said fastening brackets at about 120°.

10. The system of claim 9, wherein said bend of said fastening brackets aligns a flange thereof with said support legs of said bottom saddle support.

11. The system of claim 1, wherein said strap is adjustably secured to said I-beam.

12. The system of claim 1, wherein a means for connecting said fastening brackets to said support legs of said bottom saddle support are elongated apertures, bolts passing therethrough and nuts to secure the same.

13. A method for supporting an electrical, pipe-shaped enclosure for transmission of electrical power and or adjusting in three axis without breaking of welds, comprised of a series of end to end connected pipe members, comprising:
placing a bottom portion of said pipe-shaped enclosure on a bottom saddle support having a central region and downwardly extending support legs at opposed ends of said central region;
adjustably supporting said support legs on an upwardly and angularly extending flange of fastening brackets;
adjustably securing another flange of said fastening brackets to a horizontal flange of an I-beam located on a support; and
wrapping a strap over a top of said pipe-shaped enclosure, said strap provided with a T-shaped strap bolt, said T-shaped strap bolt being threaded and adjustably secured through said fastening brackets and to a top of said horizontal flange of the I-beam.

14. The method of claim 13, wherein each of the bottom saddle support and said fastening brackets are substantially composed of aluminum.

15. The method of claim 13, wherein each of the bottom saddle support and said fastening brackets have a thickness of about ¼ inch.

16. The method of claim 13, wherein the strap is substantially composed of stainless steel.

17. The method of claim 13, wherein the strap has a thickness of about 0.035 inch.

18. The method of claim 13, wherein the T-shaped strap bolt is secured across a longitudinal axis of the strap, and a central and threaded leg of the T-shaped strap bolt adjustably passes through both said fastening brackets and said horizontal flange of the I-beam.

19. The method of claim 13, wherein a bend is provided in each of said fastening brackets at about 120°.

20. The method of claim 13 wherein said support legs, said fastening brackets, and said T-shaped strap bolt are adjustably secured by use of elongated apertures in said fastening brackets, and nuts and threaded bolts.

* * * * *